United States Patent Office 2,978,746
Patented Apr. 11, 1961

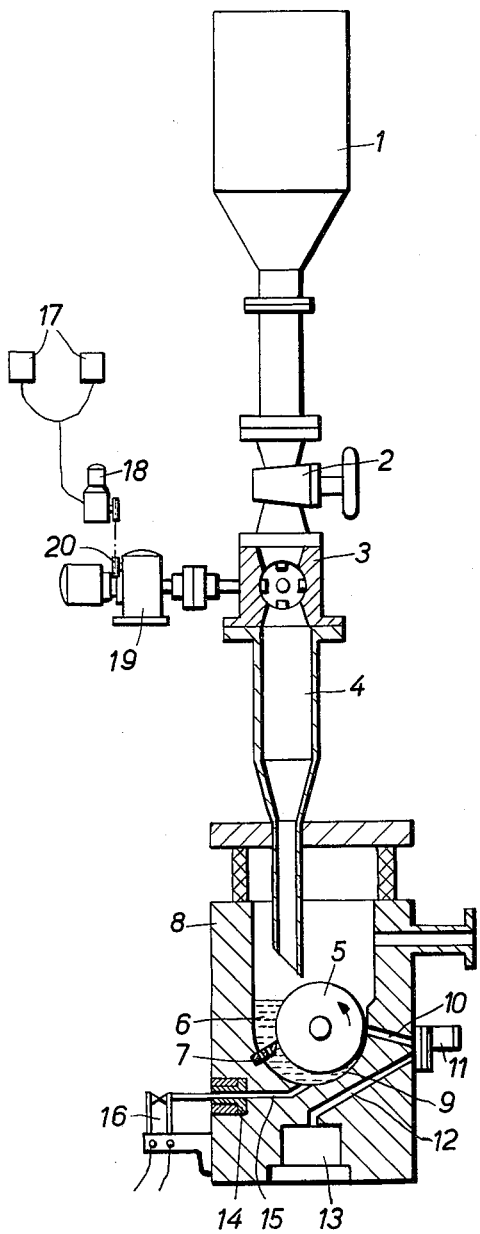

2,978,746

METHOD OF AND APPARATUS FOR MELTING ORGANIC THERMOPLASTIC PLASTICS

Wolf Rodenacker, Dormagen, Germany, assignor to Farbenfabriken Bayer Aktiengesellschaft, Leverkusen, Germany, a corporation of Germany Filed Mar. 29, 1956, Ser. No. 574,925

Claims priority, application Germany Apr. 2, 1955

5 Claims. (Cl. 18—8)

This invention relates to a method of and apparatus for melting organic thermoplastic plastics, especially polyamides or polyurethanes in a melting chamber which is preferably under vacuum.

We have found that products of superior quality can be obtained from thermo-plastic plastics in processes which involve a melting of these plastics, such as in the production of bristles and films, if the thermo-plastic material to be melted is fed to the melting chamber at a rate which depends upon the level of the melt in said melting chamber. The process of the invention is applicable to all thermo-plastic plastics and presents particular advantages in the processing of these thermo-plastic materials which are unstable to heat, such as certain polyamides and polyurethanes.

Apparatus for carrying out the method comprises a pressure-, temperature- or conductivity-measuring device which is influenced by the height of the melt and which transmits the change in level of the melt through a make-and-break contact to a relay which varies the speed of a controlled-feed device through an adjusting motor and a variable gear.

One embodiment of an apparatus for carrying out the method is shown diagrammatically and by way of example in the single figure of the accompanying drawing.

In the apparatus shown in the drawing, material to be melted, for example in the form of chips, passes from a container 1 and through a rock 2 into a controlled-feed device 3, which is a bucket wheel, although other constructions are possible. From the latter, the pieces drop through a supply pipe 4 on to a roller 5 revolving in the direction of the arrow and fill a melting chamber 6, which has a grid 7 which prevents the pieces from falling to the bottom of the chamber. The chamber is formed in a block 8, which is heated. Due to the rotation of the roller 5, the pieces which dip into the melt are moved in the melting chamber and the melting process is accelerated. The melt is moved in a spiral path from the inlet side to the outlet side of the melting chamber and forms a film on the roller 5. It is drawn into a tapered gap 9 and fed under pressure through a discharge bore 10 to a pump 11. Arranged in the block 8 is a pressure-measuring device 14, which communicates via a tubular channel 15 with the melting chamber 6. The pressure on the device 14 varies according to the level of the liquid in the chamber 6. These variations in pressure are transmitted to a contact device 16, in which a make-and-break contact switches a relay 17 on and off, the relay switching on a small adjustment motor 18 for movement towards the left or right. This motor adjusts a variable-ratio gear 19 in the driving train of the controlled-feed device 3 to a higher or lower speed, and thus varies the rate at which pieces of solid material are supplied. Arranged on an adjustment disc 20 of the gear 19 which is controlled by the motor 18 are limit switches (not shown) which limit the gear adjustment within a range which can be fixed as desired.

The measurement of the level by means of pressure also assures constant regulation of the rate of supply of material, in that a diaphragm by which the pressure in the tapered gap is measured exerts a force on an electric carbon pressure resistance, which is used directly for regulating the speed of a direct or alternating current motor.

Instead of measurement of the pressure being used for controlling the controlled-feed device, it is also possible to use a conductivity-measuring device, for example, which is influenced by the level of the liquid. The method can also be used with other melting devices which are known per se, for example those with fixed heating surfaces. The method can also be applied to melting devices in which the raw material is not in the form of scraps or pieces, but is in the form of filaments or strips which are continuously polymerised. The pieces can also be supplied at a steady rate by oscillating measuring troughs or oscillating shut-off members, the stroke thereof being adjustable and the adjustment being controlled in the aforementioned manner.

The method can be used with advantage in melting devices for the production of bristles, films and especially silk, where it is important to have a particularly homogeneous melt, which can only be obtained at constant temperature and with a constant level and thus a constant residence time in the apparatus with a uniform melting effect without the material being pre-heated for a long time in the region of its melting point.

I claim:

1. Process for melting solid thermoplastic material which comprises maintaining a quantity of the material in molten condition in a trough-shaped melting vessel of substantially semi-circular cross-sectional shape, maintaining a roller eccentrically positioned in said trough to define a space between it and the adjacent wall of the trough, said space being of a constricted arcuate cross-sectional shape decreasing in cross-sectional size from one side to the opposite side of said vessel, rotating said roller in contact with a portion of the upper surface of said quantity of material in a direction from the increased to the decreased cross-sectional size of said space, introducing solid thermoplastic material to be melted into said quantity on the side of said roller where it begins its path of movement through the molten material, substantially continuously withdrawing molten material at the side of said roller where it completes its path of movement through the molten material and adjusting the quantity of solid material introduced to maintain the level of the material in said vessel substantially constant.

2. Process according to claim 1 in which said plastic material is a substantially linear polyurethane.

3. Apparatus for melting plastic material comprising a trough-shaped vessel of substantially semi-circular cross-sectional shape, means defining a continuously moving roller eccentrically positioned in said vessel and partially extending below the normal liquid level of said vessel to define a space between it and the adjacent wall of the vessel, said space being of constricted arcuate cross-sectional shape decreasing in cross-sectional size from one side to the opposite side in the direction of rotation of the roller, means for introducing solid material into said vessel on the side of said roller where it begins its path of movement below the liquid level of said vessel, an outlet for molten material on the side of said roller where it completes its path of movement below the liquid level of said vessel, and means responsive to liquid level change of material in said vessel controlling said means for introducing solid material to maintain a substantially constant level in said vessel.

4. Apparatus according to claim 3 including a perforate grid positioned in said vessel below the normal liquid level thereof and extending from the wall of said vessel to adjacent said moving roller to prevent the passage of solid material therepast.

5. Apparatus according to claim 3 in which said means for introducing solid material into said vessel includes a relay controlling the speed of a cold feed device through an adjusting motor and variable gear.

References Cited in the file of this patent

UNITED STATES PATENTS

| | | |
|---|---|---|
| 2,075,735 | Loomis | Mar. 30, 1937 |
| 2,437,685 | Dreyfus | Mar. 16, 1948 |
| 2,437,686 | Dreyfus | Mar. 16, 1948 |
| 2,596,272 | Moravec | May 13, 1952 |
| 2,719,776 | Kummel | Oct. 4, 1955 |
| 2,747,224 | Koch et al. | May 29, 1956 |

FOREIGN PATENTS

| | | |
|---|---|---|
| 498,660 | Italy | Sept. 30, 1954 |